United States Patent
Mori et al.

(10) Patent No.: US 10,228,195 B2
(45) Date of Patent: Mar. 12, 2019

(54) CHEMICAL HEAT STORAGE DEVICE

(71) Applicant: KABUSHIKI KAISHA TOYOTA JIDOSHOKKI, Aichi (JP)

(72) Inventors: Kenji Mori, Aichi (JP); Hideaki Suzuki, Aichi (JP); Takafumi Mizuno, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 15/578,162

(22) PCT Filed: May 20, 2016

(86) PCT No.: PCT/JP2016/065064
§ 371 (c)(1),
(2) Date: Nov. 29, 2017

(87) PCT Pub. No.: WO2016/194662
PCT Pub. Date: Dec. 8, 2016

(65) Prior Publication Data
US 2018/0142962 A1    May 24, 2018

(30) Foreign Application Priority Data
Jun. 4, 2015   (JP) .................................. 2015-113821

(51) Int. Cl.
*F23L 15/02* (2006.01)
*F28D 20/00* (2006.01)
(Continued)

(52) U.S. Cl.
CPC ........... *F28D 20/003* (2013.01); *F01N 3/021* (2013.01); *F01N 3/103* (2013.01); *F01N 3/2006* (2013.01);
(Continued)

(58) Field of Classification Search
CPC .. F28D 20/003; F28D 20/00; F28D 2020/006; F28D 2020/0078; F01N 3/021;
(Continued)

(56) References Cited

U.S. PATENT DOCUMENTS 8,361,422 B2   1/2013  Soukhojak et al.
9,316,135 B2*  4/2016  Hariu .................. C09K 5/16
(Continued)

FOREIGN PATENT DOCUMENTS

EP    1 068 924      1/2001
EP    2857784        4/2015
(Continued)

OTHER PUBLICATIONS

Search Report received in EP Patent Application No. 16803097.1, dated Apr. 25, 2018.
(Continued)

*Primary Examiner* — Davis D Hwu
(74) *Attorney, Agent, or Firm* — Greenblum & Bernstein, P.L.C.

(57) ABSTRACT

A chemical heat storage device includes a reactor which has a heat storage material which generates heat by a chemical reaction with a reactive medium and desorbs the reactive medium by heat absorption, and a receptacle which houses the heat storage material therein; a reservoir which stores the reactive medium; a connecting pipe through which the reactor and the reservoir communicate with each other and the reactive medium is allowed to flow between the reactor and the reservoir, wherein the reactive medium is ammonia, the receptacle is made of a metallic material (for example, stainless steel), and at least a portion of an inner surface of the receptacle which comes into contact with the ammonia is formed with a nickel layer containing 90% nickel by mass or more.

5 Claims, 7 Drawing Sheets

(51) Int. Cl.
| | |
|---|---|
| *F28F 19/06* | (2006.01) |
| *F28F 21/08* | (2006.01) |
| *F01N 3/10* | (2006.01) |
| *F01N 3/20* | (2006.01) |
| *F01N 5/02* | (2006.01) |
| *F01N 3/021* | (2006.01) |

(52) U.S. Cl.
CPC ............ *F01N 3/2066* (2013.01); *F01N 5/02* (2013.01); *F28D 20/00* (2013.01); *F28F 19/06* (2013.01); *F28F 21/08* (2013.01); *F28F 21/083* (2013.01); *F28F 21/087* (2013.01); *F28F 21/089* (2013.01); *F01N 2240/10* (2013.01); *F01N 2570/18* (2013.01); *F01N 2610/02* (2013.01); *F28D 2020/006* (2013.01); *F28D 2020/0078* (2013.01); *Y02E 60/142* (2013.01)

(58) Field of Classification Search
CPC ...... F01N 3/103; F01N 3/2006; F01N 3/2066; F01N 5/02; F01N 2240/10; F01N 2570/18; F01N 2610/02; F28F 19/06; F28F 21/08; F28F 21/083; F28F 21/087; F28F 21/089; Y02E 60/142; C09K 5/16
USPC ............................................................ 165/6
See application file for complete search history.

(56) References Cited

U.S. PATENT DOCUMENTS

| | | | |
|---|---|---|---|
| 2010/0236225 | A1* | 9/2010 | Wahl .................... F01N 3/2066 60/301 |
| 2012/0045378 | A1 | 2/2012 | Soukhojak et al. |
| 2015/0192049 | A1 | 7/2015 | Suzuki et al. |
| 2015/0247651 | A1 | 9/2015 | Hariu et al. |

FOREIGN PATENT DOCUMENTS

| | | |
|---|---|---|
| JP | 8-259211 | 10/1996 |
| JP | 3350667 | 11/2002 |
| JP | 2003-28299 | 1/2003 |
| JP | 2013-190114 | 9/2013 |
| JP | 2013-539517 | 10/2013 |
| JP | 2013-234625 | 11/2013 |
| JP | 2014-9776 | 1/2014 |
| WO | 2014/025024 | 2/2014 |
| WO | 2014/065086 | 5/2014 |

OTHER PUBLICATIONS

Search Report issued in PCT/JP2016/065064, dated Aug. 16, 2016.
International Preliminary Report on Patentability issued in PCT/JP2016/065064 and English translation thereof, dated Dec. 5, 2017.
Office Action issued in Japan Counterpart Patent Appl. No. 2015-113821, dated Sep. 4, 2018.

* cited by examiner

CHEMICAL HEAT STORAGE DEVICE

TECHNICAL FIELD

The present invention relates to a chemical heat storage device.

BACKGROUND ART

As a conventional chemical heat storage device, for example, a device described in Patent Literature 1 has been known. The device described in Patent Literature 1 includes a heat accumulator (reactor) which heats an oxidation catalyst provided in an exhaust system of an internal combustion engine. In the chemical heat storage device, when heating the oxidation catalyst, by supplying ammonia as a reactive medium to the reactor, the heat storage material contained in the reactor is made to chemically react with ammonia to generate heat. Further, in the chemical heat storage device, in order to suppress the thermal decomposition of ammonia in the reactor when the oxidation catalyst reaches a high-temperature state, the oxidation catalyst is divided into a first region on an upstream side and a second region on a downstream side thereof, and the reactor is disposed around the first region having a smaller carried amount of catalyst than the second region.

CITATION LIST

Patent Literature

Patent Literature 1: Japanese Unexamined Patent Publication No. 2013-234625

SUMMARY OF INVENTION

Technical Problem

Incidentally, in the case of a chemical heat storage device using ammonia as a reactive medium, as a receptacle constituting the reactor, the receptacle having excellent corrosion resistance of ammonia and having strength enough to withstand the pressure of ammonia supplied from a reservoir at the time of heating of an object to be heated is required. For this reason, the receptacle is usually formed of a metallic material (for example, stainless steel). However, when the temperature of the reactor reaches a high temperature, the metal constituent (for example, iron or chromium contained in the stainless steel) and ammonia contained in the metallic material react with each other, and the metal constituent and nitrogen contained in the ammonia combine to generate a nitride compound. In the process of the nitridation reaction, hydrogen is desorbed from ammonia. As a result, the number of moles of ammonia (gas) in the system of the chemical heat storage device through which ammonia flows changes, and the pressure in the system changes. For this reason, it is difficult to control the pressure of valves and the like in the chemical heat storage device, and desorbed hydrogen inhibits diffusion of ammonia into the heat storage material in the reactor, thereby deteriorating the heat generation performance in the reactor.

Thus, an object of the present invention is to provide a chemical heat storage device that suppresses deterioration of heat generation performance accompanied by nitridation of a receptacle caused by ammonia.

Solution to Problem

A chemical heat storage device according to an aspect of the present invention includes a reactor which has a heat storage material which generates heat by a chemical reaction with a reactive medium and desorbs the reactive medium by heat absorption, and a receptacle which houses the heat storage material therein; a reservoir which stores the reactive medium; a connecting pipe through which the reactor and the reservoir communicate with each other and the reactive medium is allowed to flow between the reactor and the reservoir, wherein the reactive medium is ammonia, the receptacle is made of a metallic material, and at least a portion of an inner surface of the receptacle which comes into contact with the ammonia is formed with a nickel layer containing 90% nickel by mass or more.

In the chemical heat storage device, a nickel layer is formed on the inner surface of the receptacle of the reactor. Therefore, the contact between the metallic material of the receptacle and the ammonia in the receptacle is suppressed by the nickel layer, and nitridation of the receptacle caused by contact with the metallic constituent contained in the metallic material is suppressed. Nickel contained in the nickel layer in an amount of 90% by mass or more is a metal which does not cause a nitridation reaction with ammonia even when it is in a high temperature state, and is hard to form a nitride compound. Therefore, even when the reactor reaches a high temperature state, nitridation of the receptacle surface caused by ammonia is suppressed, and generation of hydrogen is also suppressed. Accordingly, in the chemical heat storage device, it is possible to suppress deterioration of heat generation performance due to nitridation of the receptacle caused by ammonia.

In the chemical heat storage device of an embodiment, the nickel layer may be formed by a nickel plating process. In this case, by a nickel plating process, a nickel layer containing 90% by mass or more can be easily formed on the inner surface of the receptacle.

In the chemical heat storage device of an embodiment, the receptacle may be manufactured, using a clad material formed of a plate material made of a metallic material and a plate material made of nickel, and the nickel layer may be formed of a plate material made of nickel among clad materials. In this case, a nickel layer containing approximately 100% nickel by mass can be formed on the inner surface of the receptacle.

In the chemical heat storage device of an embodiment, the metallic material may be stainless steel. In the chemical heat storage device, it is possible to suppress the nitridation reaction between ammonia and a metal constituent such as iron contained in the stainless steel, by the nickel layer.

In the chemical heat storage device of an embodiment, the reactor may have a plurality of heat storage materials and a plurality of heat exchange sections, and the plurality of heat storage materials and the plurality of heat exchange sections may be alternately laminated. In the case of this configuration, the heat exchange efficiency between the object to be heated and the heat storage material is improved, and the heating efficiency of the reactor is improved.

Advantageous Effects of Invention

According to the present invention, it is possible to suppress deterioration in heat generation performance associated with nitridation of a receptacle caused by ammonia.

DESCRIPTION OF EMBODIMENTS

Figure 1:
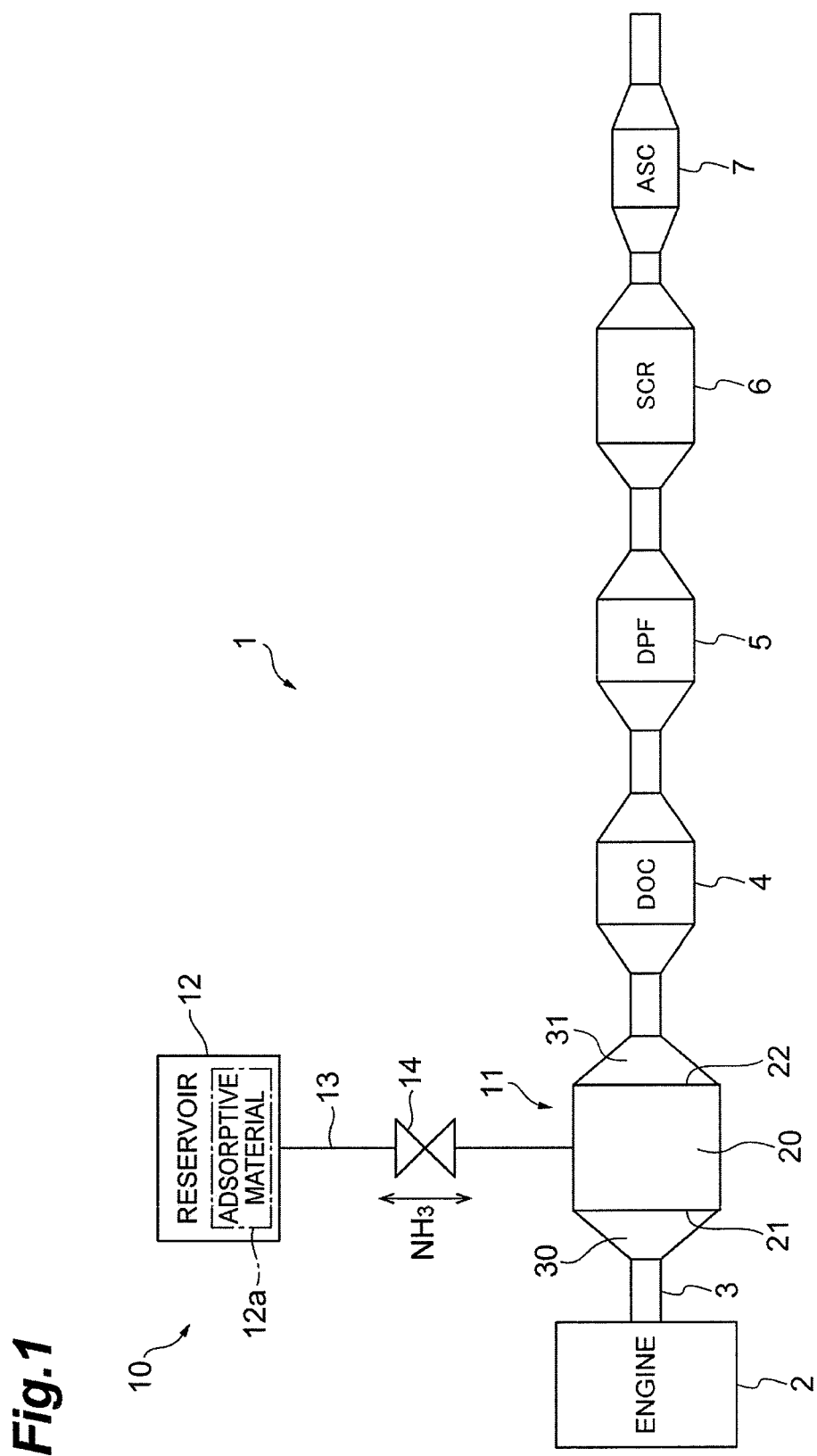
FIG. 1 is a schematic configuration diagram of an exhaust gas purification system equipped with a chemical heat storage device according to an embodiment.

Hereinafter, a chemical heat storage device according to an embodiment of the present invention will be described with reference to the drawings. In each drawing, the same or corresponding elements are denoted by the same reference numerals, and the repeated description will not be provided.

The chemical heat storage device according to the embodiment is applied to a chemical heat storage device provided in an exhaust gas purification system provided in an exhaust system of an engine (an internal combustion engine) of a vehicle. The exhaust gas purification system according to the embodiment is a system which purifies harmful substances (environmental pollutants) contained in the exhaust gas discharged from an engine (in particular, a diesel engine), and includes a diesel oxidation catalyst (DOC), a selective catalytic reduction (SCR), an ammonia slip catalyst (ASC) of catalyst, and diesel particulate filter (DPF) of filter. Furthermore, the exhaust gas purification system according to the embodiment is provided with a warming-up chemical heat storage device.

An overall configuration of an exhaust gas purification system 1 according to an embodiment will be described with reference to FIG. 1. FIG. 1 is a schematic configuration diagram of the exhaust gas purification system 1 according to an embodiment.

The exhaust gas purification system 1 is provided with a diesel oxidation catalyst (DOC) 4, a diesel exhaust particulate removal filter (DPF) 5, a selective catalytic reduction (SCR) 6, and an ammonia slip catalyst (ASC) 7, from an upstream side to a downstream side of a exhaust pipe 3 connected to an exhaust side of the engine 2. The exhaust gas discharged from the engine 2 flows inside the exhaust pipe 3, the DOC 4, the DPF 5, the SCR 6, and the ASC 7. Depending on the flowing direction of the exhaust gas, the upstream side and the downstream side are defined.

The DOC 4 is a catalyst that oxidizes HC, CO, or the like contained in the exhaust gas. The DPF 5 is a filter that traps and removes PM contained in the exhaust gas. The SCR 6 is a catalyst that causes the ammonia to chemically react with NOx contained in the exhaust gas, thereby reducing and purifying NOx, when ammonia ($NH_3$) or urea water (hydrolyzed to generate ammonia) is supplied to the upstream side of the SCR 6 in the exhaust pipe 3. The ASC 7 is a catalyst that oxidizes ammonia passing through the SCR 6 and flowing to the downstream side.

Each of the catalysts 4, 6, and 7 has a temperature range (that is, an activation temperature) in which the purifying capability against environmental pollutants can be exhibited. When the temperature of each of the catalysts 4, 6, and 7 is lower than the activation temperature (for example, at the time of cold start of the engine 2), each of the catalysts 4, 6, and 7 cannot exhibit sufficient purification capability. Further, in the case of warming the catalyst with the exhaust gas discharged from the engine 2, immediately after the cold start of the engine 2, since the temperature of the exhaust gas is relatively low, the catalyst cannot be quickly warmed up. Therefore, the exhaust gas purification system 1 is provided with the chemical heat storage device 10 to warm the exhaust gas on the upstream side of the DOC 4 which is the most upstream catalyst.

The chemical heat storage device 10 is a device that heats (warms up) an object to be heated with no external energy, by utilizing a reversible chemical reaction. Specifically, the chemical heat storage device 10 stores a reactive medium desorbed from the heat storage material by the heat supplied from the object to be heated. The chemical heat storage device 10 is a device which causes the heat storage material and the reactive medium to chemically react with each other and warms the object to be heated using the reaction heat (heat radiation) at the time of the chemical reaction, by supplying the stored reactive medium to the heat storage material at a necessary time. That is, the chemical heat storage device 10 is a device which stores heat from the object to be heated and supplies heat to the object to be heated, using a reversible chemical reaction. In the present embodiment, the object to be heated is exhaust gas and the reactive medium is ammonia.

Figure 2:
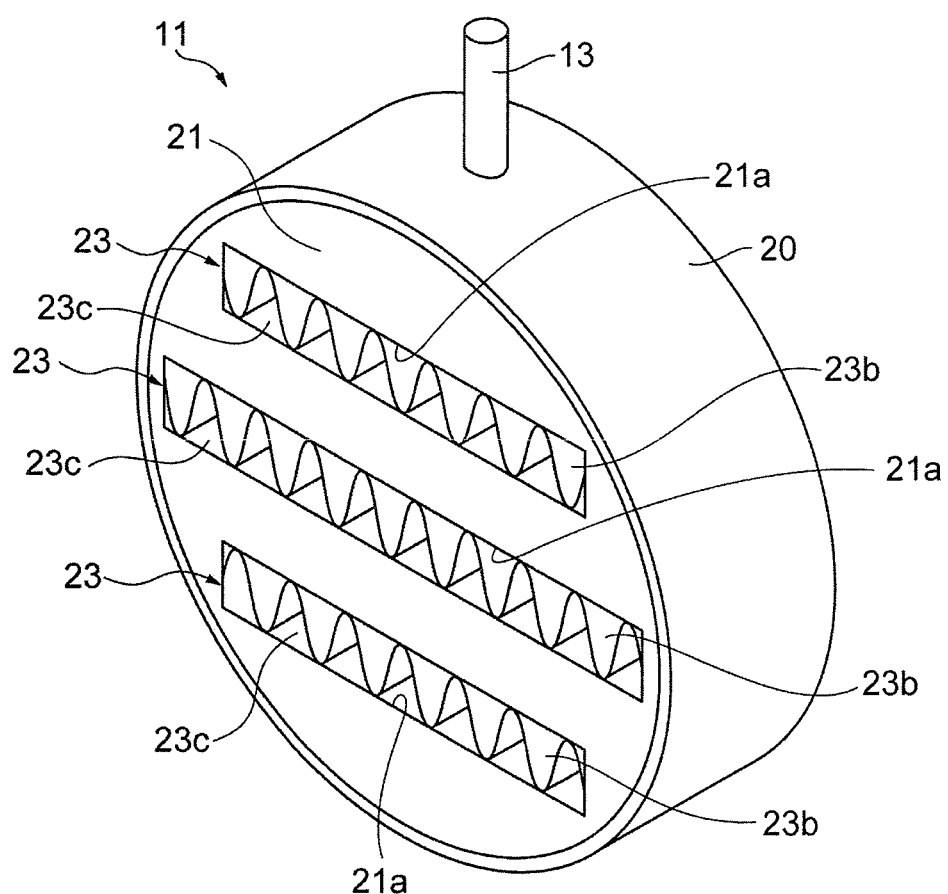
FIG. 2 is a perspective view of a reactor with a heat exchange section of FIG. 1.
Figure 3:
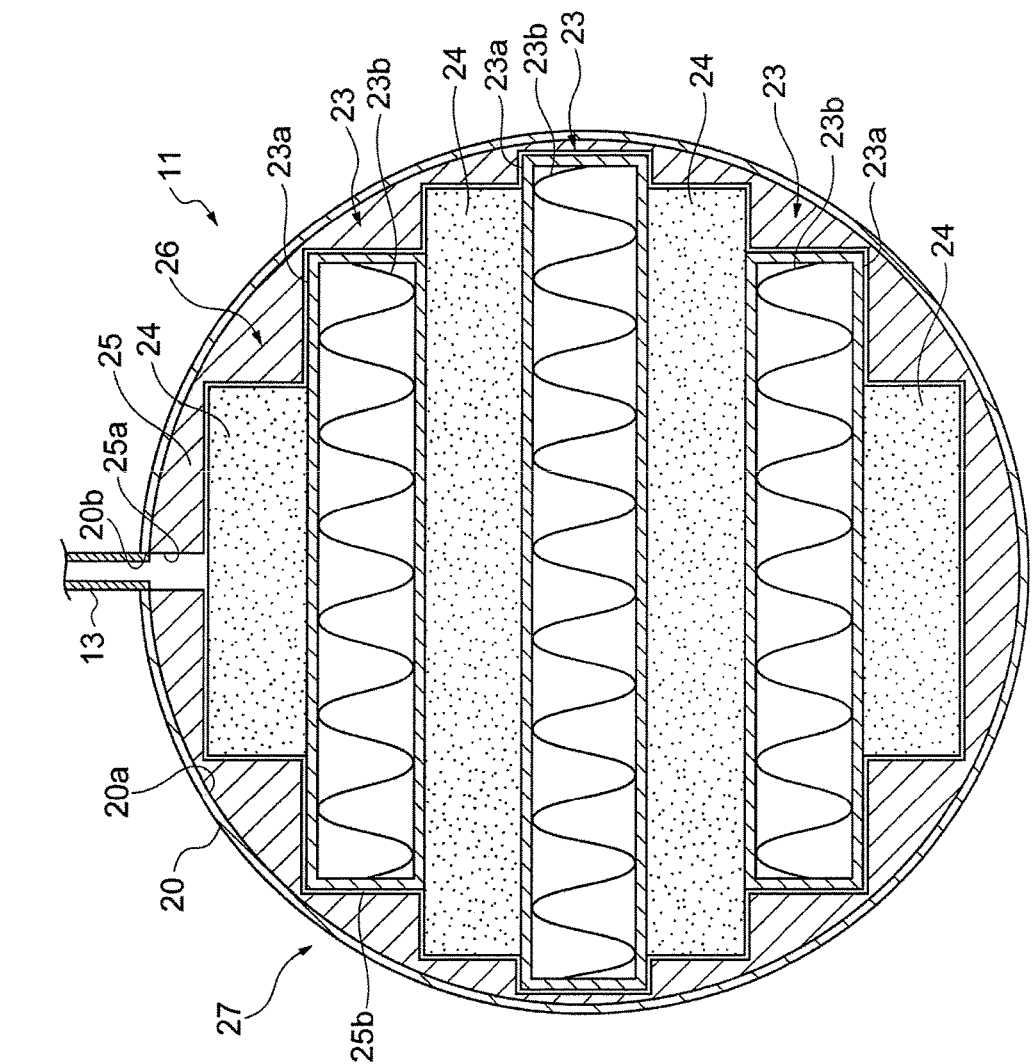
FIG. 3 is a side cross-sectional view of the reactor with the heat exchange section of FIG. 1.

The chemical heat storage device 10 will be described in detail with reference to FIGS. 2 and 3 in addition to FIG. 1. FIG. 2 is a perspective view of the reactor 11 with a heat exchange section of FIG. 1. FIG. 3 is a side sectional view of the reactor 11 with the heat exchange section of FIG. 1.

The chemical heat storage device 10 includes a reactor 11 with a heat exchange section, a reservoir 12, a connecting pipe 13, and a valve 14. The reactor 11 with the heat exchange section is disposed between the engine 2 and the DOC 4. The reactor 11 with the heat exchange section functions as a heater to heat the exhaust gas via the heat exchange section on the upstream side of the DOC 4 which is the catalyst disposed on the most upstream side. The exhaust gas heated by heating flows into each of the downstream catalysts (DOC 4, SCR 6, and ASC 7). As a result, each catalyst is warmed up.

The reactor 11 with the heat exchange section includes a pipe 20, two lid members 21 and 22, a plurality of heat exchange sections 23, a plurality of heat storage materials 24, and a heat insulating material 25. As illustrated in FIG. 3, the plurality of heat exchange sections 23 and the plurality of heat storage materials 24 are alternately laminated to form a laminated body 26. The heat storage materials 24 are disposed at both end portions (the outermost portion in the lamination direction) of the laminated body 26. Therefore, the number of heat storage materials 24 is one more than the number of heat exchange sections 23. In FIG. 3, the number of the heat exchange sections 23 is three and the number of the heat storage materials 24 is four, but the numbers are not particularly limited thereto, and the number of the heat exchange sections 23 and the heat storage materials 24 may be an appropriate number.

The pipe 20 is a pipe that surrounds the laminated body 26. The pipe 20 has a cylindrical shape having a circular cross section. The pipe 20 has a diameter larger than the diameter of the exhaust pipe 3. The upstream side of the pipe 20 is connected to the exhaust pipe 3 via a taper pipe 30. The downstream side of the pipe 20 is connected to the exhaust pipe 3 via the taper pipe 31. The lid member 21 is joined to an end portion on the upstream side of the pipe 20. The lid member 22 is joined to an end portion on the downstream side of the pipe 20. The lid members 21 and 22 have a circular plate shape corresponding to the shape of the pipe 20. The pipe 20 and the lid members 21 and 22 are made of stainless steel (SUS). Stainless steel is an alloy steel which contains iron (Fe) as a main constituent and contains metal such as chromium (Cr), nickel (Ni), and molybdenum (Mo).

The heat exchange section 23 forms a flow path through which the exhaust gas as an object to be heated circulates, and exchanges heat between the exhaust gas and the heat storage material 24. The heat exchange section 23 is disposed between the heat storage material 24 and the heat storage material 24 which are adjacent to each other in the lamination direction of the laminated body 26. As illustrated in FIG. 3, each length of the plurality of heat exchange sections 23 in the width direction (a direction orthogonal to the flowing direction of the exhaust gas and orthogonal to the lamination direction of the laminated body 26) is set to flow an inner circumferential surface 20*a* of the cylindrical pipe 20. Specifically, the length of the plurality of heat exchange sections 23 in the width direction becomes shorter as the heat exchange section 23 disposed on the end portion side from the central side in the lamination direction of the laminated body 26. The lengths of the plurality of heat exchange sections 23 in the flowing direction of the exhaust gas are all the same length, and are substantially the same length as the length of the pipe 20.

The heat exchange section 23 has a metallic tube 23*a*, and a metallic fin 23*b* disposed in the tube 23*a*. In this embodiment, the tube 23*a* is formed into a flat square cylindrical shape. The upstream end portion and the downstream end portion of the tube 23*a* are open. A through-hole 21*a* (only the through-hole 21*a* of the lid member 21 on the upstream side is illustrated in FIG. 2) is formed in each of the lid members 21 and 22 to correspond to an opening portion 23*c* of the tube 23*a*. The upstream end portion and the downstream end portion of the tube 23*a* are jointed to each of the lid member 21 and the lid member 22 by welding, brazing, or the like, in the state of being fitted into the through-hole 21*a* of the lid member 21 and a through-hole (not illustrated) of the lid member 22, respectively. As a result, the exhaust gas can pass through the interior of the tube 23*a*. The fins 23*b* are members for promoting the heat exchange between the exhaust gas and the heat storage material 24. The fins 23*b* have, for example, a wave-like cross section. The fins 23*b* are joined to the inner wall surface of the tube 23*a* by welding, brazing or the like. The tubes 23*a* and the fins 23*b* are made of, for example, stainless steel.

In this way, in the reactor 11 with the heat exchange section, the lid members 21 and 22 are joined to the upstream end portion and the downstream end portion of the pipe 20, and a plurality of heat exchange sections 23 is disposed between the lid members 21 and 22. The plurality of heat storage materials 24 is housed in a space excluding a portion in which a plurality of heat exchange sections 23 is disposed, among the cylindrical spaces formed by the pipe 20 and the lid members 21 and 22. Therefore, in the reactor 11 with the heat exchange section, the receptacle 27 in which the plurality of heat storage materials 24 is housed is formed by the pipe 20, the lid members 21 and 22, and the plurality of heat exchange sections 23 (particularly, the tube 23*a*).

The heat storage material 24 is disposed between the heat exchange section 23 and the heat exchange section 23 adjacent to each other in the lamination direction of the laminated body 26 or at the end portion in the lamination direction. As illustrated in FIG. 3, each length of the heat storage material 24 in the width direction is set to follow the inner circumferential surface 20*a* of the cylindrical pipe 20. The lengths of the plurality of heat storage materials 24 in the flowing direction of the exhaust gas are all the same length and are slightly shorter than the pipe 20.

The heat storage material 24 is a press-molded product press-molded into a pellet shape. The heat storage material 24 has a substantially flat rectangular parallelepiped shape. When supplying ammonia as a reactive medium, the heat storage material 24 chemically reacts (chemically adsorb) with ammonia to generate heat. Further, when the heat storage material 24 to which ammonia is chemically adsorbed is heated by the exhaust gas heated to a high temperature via the heat exchange section 23, the heat storage material 24 absorbs the heat and desorbs ammonia. As the heat storage material 24, a halogen compound represented by the composition formula MXa is used. M is an alkaline earth metal such as Mg, Ca, and Sr or a transition metal such as Cr, Mn, Fe, Co, Ni, Cu or Zn. X is Cl, Br, I or the like. Symbol 'a' is a number specified by the valence of M and is 2, and 3. Additives for improving thermal conductivity may be mixed with the heat storage material 24. Additives are, for example, carbon fiber, carbon beads, SiC beads, metal beads, polymer beads, and polymeric fibers. The metallic material of the metal beads is, for example, Cu, Ag, Ni, Ci-Cr, Al, Fe, and stainless steel.

The heat insulating material 25 is interposed between the inner circumferential surface 20*a* of the pipe 20 and the laminated body 26. The outer circumferential surface side of the heat insulating material 25 has a shape formed along the inner circumferential surface 20*a* of the pipe 20. The inner circumferential surface side of the heat insulating material 25 has a shape formed along the edge portion of the laminated body 26. The heat insulating material 25 is formed of, for example, a hard ceramic material. By providing such a heat insulating material 25 on the outside of the heat storage material 24, heat generated in the heat storage material 24 is hard to escape to the outside of the pipe 20. Further, the heat insulating material 25 may be disposed outside the reactor 11 with the heat exchange section.

The reservoir 12 has an adsorptive material 12*a*. The adsorptive material 12*a* holds ammonia by physical adsorption and desorbs (separates) ammonia in accordance with the pressure. As the adsorptive material 12*a*, for example, activated carbon is used. In the reservoir 12, ammonia is desorbed from the adsorptive material 12*a* at the time of warming up, and is supplied to the reactor 11 (heat storage material 24) with the heat exchange section, and ammonia desorbed from the heat storage material 24 is recovered by being physically adsorbed to the adsorptive material 12*a* after completion of warming up. Further, the adsorptive material 12*a* is not limited to activated carbon, and, for example, mesoporous materials having mesopores such as mesoporous silica, mesoporous carbon, and mesoporous alumina, or zeolite, silica gel may be used.

The connecting pipe 13 is a pipe which connects the reactor 11 with the heat exchange section and the reservoir 12. The connecting pipe 13 serves as a flow path which allows ammonia to circulate between the reactor 11 with the heat exchange section and the reservoir 12. As illustrated in FIG. 3, one end portion of the connecting pipe 13 on the side of the reactor 11 with the heat exchange section is joined to the pipe 20 by welding or the like, in a state of being inserted into the through-hole 20*b* formed in the pipe 20. In the heat insulating material 25, a through-hole 25*a* is formed to correspond to the position of the through-hole 20*b*. An annular groove portion 25*b* is formed on the inner circumferential surface side of the heat insulating material 25 in order to facilitate the flow of ammonia in the circumferential direction. The groove portion 25b communicates with the through-hole 25a.

The valve 14 is a valve which opens and closes the flow path of ammonia between the reactor 11 with the heat exchange section and the reservoir 12. The valve 14 is disposed in the middle of the connecting pipe 13. When the valve 14 is opened, the reactor 11 with the heat exchange section and the reservoir 12 communicate with each other via the connecting pipe 13, and ammonia can move. The opening and closing control of the valve 14 is performed by a controller dedicated to the chemical heat storage device 10 or an electronic control unit (ECU) that controls the engine 2. The valve 14 is, for example, an electromagnetic type normally-closed valve, which is opened when a voltage is applied.

In the chemical heat storage device 10, when the temperature of the exhaust gas discharged from the engine 2 is lower than a predetermined temperature (temperature set on the basis of the activation temperature of the catalyst) (for example, immediately after the start of the engine 2), the valve 14 is opened by control using the ECU or the like. As a result, the high-pressure reservoir 12 of a higher pressure filled with ammonia and the reactor 11 with the heat exchange section of a lower pressure than the reservoir 12 communicate with each other, and ammonia is desorbed from the adsorptive material 12a of the reservoir 12. Ammonia desorbed from the adsorptive material 12a flows inside the connecting pipe 13 and moves toward the reactor 11 with the heat exchange section, and is supplied into a receptacle 27 of the reactor 11 with the heat exchange section. In the reactor 11 with the heat exchange section, the supplied ammonia and each heat storage material 24 chemically react with each other to generate heat (exothermic reaction). Heat generated in each heat storage material 24 is transferred to each heat exchange section 23. In each heat exchange section 23, heat from the heat storage material 24 is imparted to the exhaust gas. That is, the heat exchange section 23 exchanges heat between the heat storage material 24 and the exhaust gas. As a result, the temperature of the exhaust gas rises. When the exhaust gas heated by the chemical heat storage device 10 flows to the downstream side, each of the catalysts (DOC 4, SCR 6, and ASC 7) is warmed up. Therefore, temperature of each catalyst quickly rises to the activation temperature or higher.

When the operation of the engine 2 continues to a certain extent after completion of warming-up, the temperature of the exhaust gas discharged from the engine 2 rises. The heat (exhaust heat) of the exhaust gas having the high temperature is transferred to each heat exchange section 23. The heat storage material 24 is heated by each of the heat exchange sections 23 heated by the heat of the exhaust gas. That is, the heat exchange section 23 exchanges heat between the exhaust gas and the heat storage material 24. At this time, the heat storage material 24, which chemically adsorbs ammonia, absorbs the heat of the exhaust gas and desorbs ammonia. As a result, ammonia is generated in the reactor 11 with the heat exchange section (regeneration reaction). In accordance with the regeneration reaction, the valve 14 is opened under the control of an ECU or the like. As a result, the ammonia generated in the receptacle 27 of the reactor 11 with the heat exchange section flows through the connecting pipe 13, moves to the reservoir 12 side, and is recovered in the reservoir 12. In the reservoir 12, ammonia is adsorbed and stored by the adsorptive material 12a.

Ammonia ($NH_3$) includes nitrogen ($N_2$) and hydrogen ($H_2$), as illustrated in formula (1). When the inside of the receptacle 27 of the reactor 11 with the heat exchange section reaches a high temperature (for example, 400° C. or higher), nitrogen of ammonia reacts with metal constituents such as iron (Fe) or chromium (Cr) present on the surface of stainless steel of the receptacle 27 (a receptacle including the pipe 20, the lid members 21 and 22, and a plurality of tubes 23a) to generate a nitridation compound on the surface of the receptacle 27. A symbol M in the formula (2) is a metal such as iron (Fe) or chromium (Cr) contained in the stainless steel, and a symbol MN is a nitride compound. When the formula (1) and the formula (2) are synthesized, the formula (3) illustrating the nitridation reaction is obtained.

[Formula 1]

$$NH_3 \rightarrow \tfrac{1}{2}N_2 + 3/2 H_2 \qquad (1)$$

$$\tfrac{1}{2}N_2 + M \rightarrow MN \qquad (2)$$

$$NH_3 + M \rightarrow 3/2 H_2 + MN \qquad (3)$$

Also, when the receptacle 27 is nitrided by ammonia, hydrogen desorbed from ammonia is generated in the process of the nitridation reaction. In particular, as determined from formula (3), when 1 mol of ammonia is decomposed by nitridation, 1.5 mol of hydrogen is generated. The generated hydrogen is not chemically adsorbed even in the heat storage material 24 of the reactor 11 with the heat exchange section, and is not physically adsorbed by the adsorptive material 12a of the reservoir 12. Therefore, the generated hydrogen is present in an empty space in the system including the reactor 11 with the heat exchange section, the reservoir 12, and the connecting pipe 13 through which ammonia flows. Therefore, as the receptacle 27 is nitrided by ammonia, the amount of hydrogen in the system increases, the partial pressure of ammonia in the system decreases, and the pressure in the system changes. When the partial pressure of ammonia in the system decreases, the heat generation temperature of the heat storage material 24 decreases when maintaining the reactor 11 with the heat exchange section at a predetermined pressure. Further, the generated hydrogen inhibits diffusion of ammonia into the heat storage material 24. As a result, the amount of heat generated at the time of warming-up of the reactor 11 with the heat exchange section is reduced, and the heat generation performance of the chemical heat storage device 10 is deteriorated. Therefore, in the chemical heat storage device 10, a nickel layer for suppressing nitridation of the receptacle 27 caused by ammonia is formed on the inner surface of the receptacle 27 of the reactor 11 with the heat exchange section.

Figure 4:
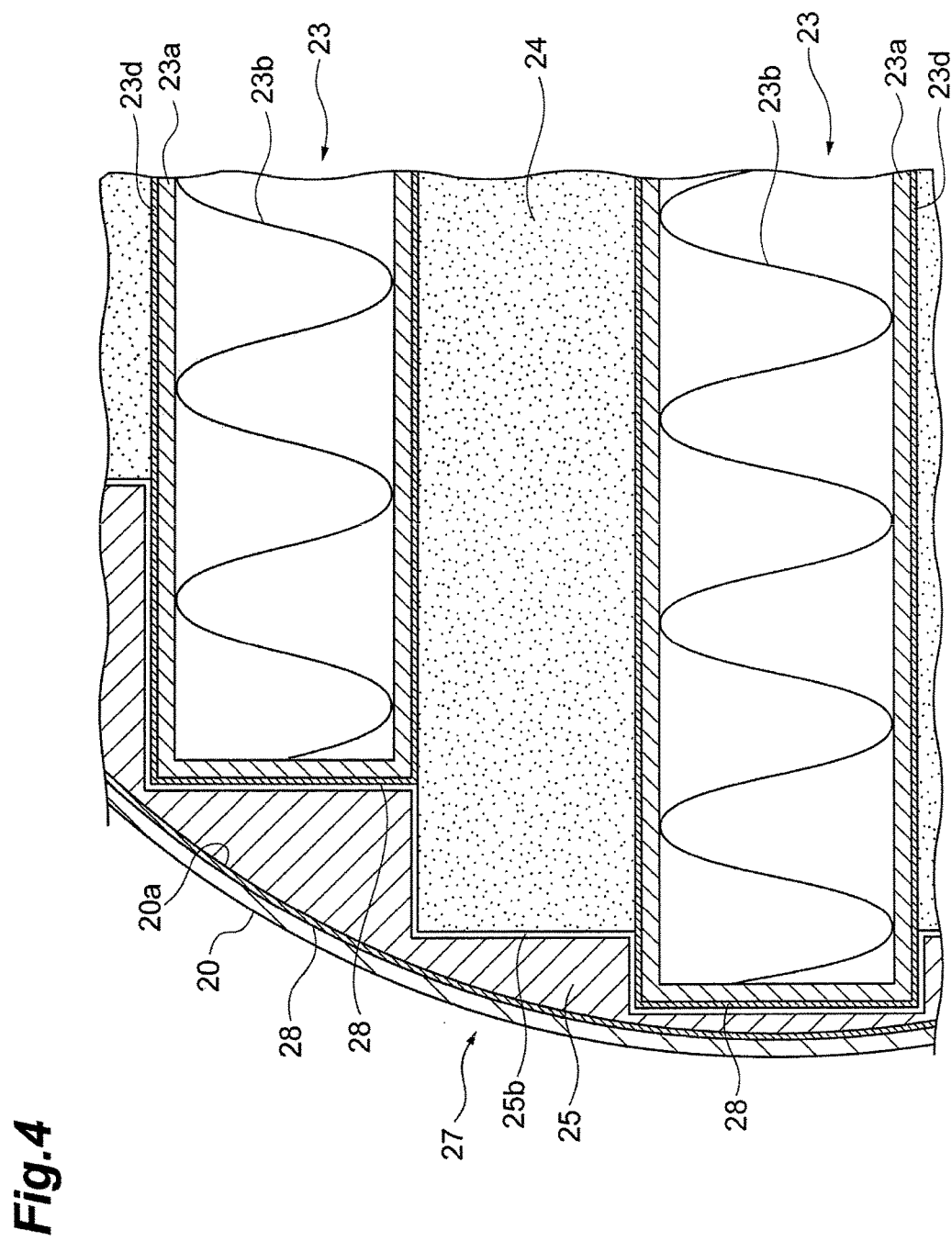
FIG. 4 is a partially enlarged plan cross-sectional side view of a reactor with a heat exchange section in FIG. 1.
Figure 5:
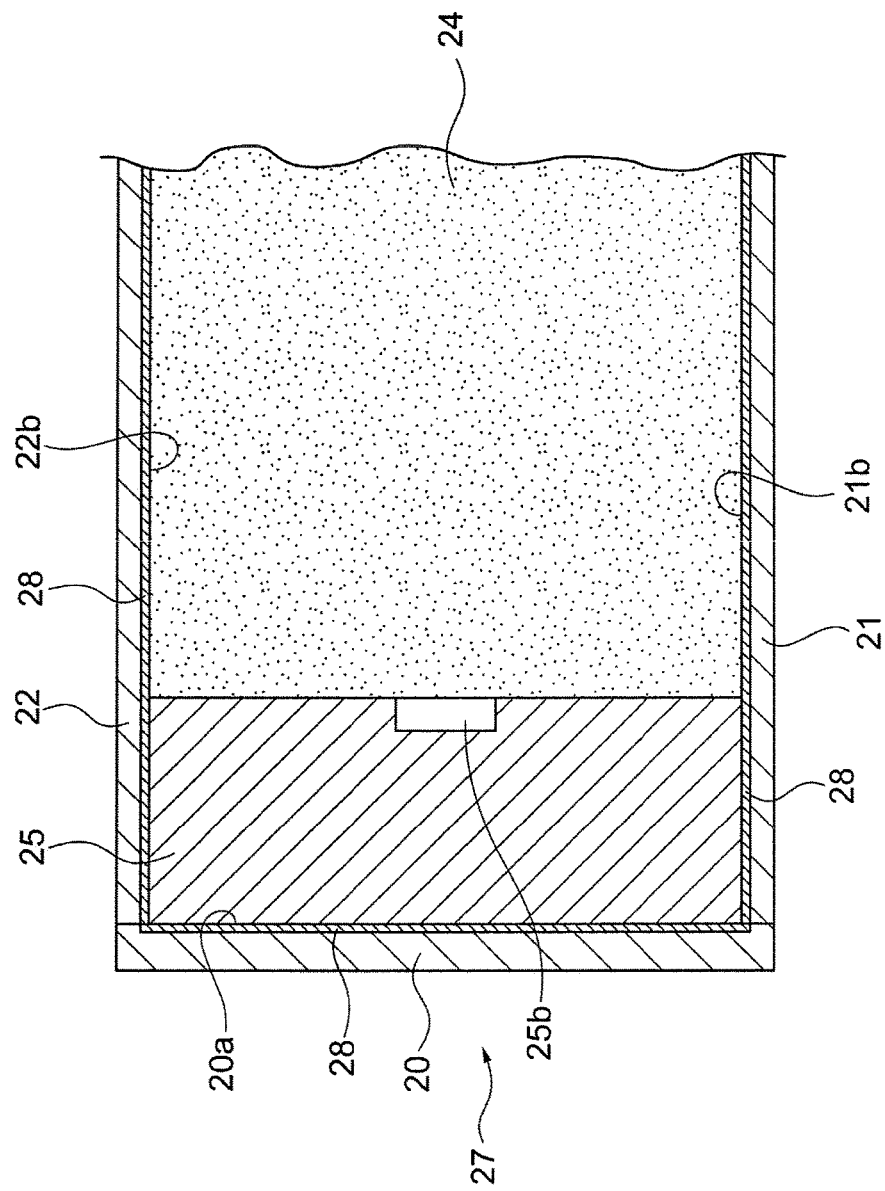
FIG. 5 is a partially enlarged plan cross-sectional view of the reactor with the heat exchange section of FIG. 1.

The nickel layer formed on the inner surface of the receptacle 27 will be described with reference to FIGS. 4 and 5 in addition to FIGS. 1 to 3. FIG. 4 is a partially enlarged side sectional view of the reactor 11 with a heat exchange section. FIG. 5 is a partially enlarged plan sectional view of the reactor 11 with a heat exchange section.

In the reactor 11 with the heat exchange section, the receptacle 27 which houses a plurality of heat storage materials 24 is formed by the pipe 20, the lid members 21 and 22, and the plurality of tubes 23a. The inner surface of the receptacle 27 is defined by the inner circumferential surface 20a of the pipe 20, the surfaces 21b and 22b on the inner side (the side of the heat storage material 24) of the lid members 21 and 22, and the surface 23d on the outer side (the heat storage material 24 side and the heat insulating material 25 side) of the plurality of tubes 23a. The respective surfaces 20a, 21b, 22b, and 23d are surfaces with which the ammonia supplied into the receptacle 27 comes into contact.

A nickel layer 28 is formed on all the surfaces 20a, 21b, 22b, and 23d which are the inner surfaces of the receptacle 27. The nickel layer 28 is a thin film that covers the inner surface of the receptacle 27 (the surface of the stainless steel). The nickel layer 28 contains 90% nickel by mass or more. Nickel is a metal that does not cause a nitridation reaction with ammonia even in a high-temperature state and is hard to produce a nitride compound. The nickel layer 28 is formed, for example, as a layer having a thickness (depth) from the surface of the stainless steel of about several μm to several tens of μm. A nickel layer may also be formed on the outer surface of the receptacle 27.

In a case where ammonia is supplied to the reactor 11 with the heat exchange section, since the nickel layer 28 is formed from the surface of the stainless steel to a predetermined region on the inner surface of the receptacle 27 which comes into contact with ammonia, the contact between metal constituents such as iron or chromium contained in the stainless steel and ammonia is suppressed. Further, nickel contained in the nickel layer 28 does not perform a nitridation reaction with ammonia. Therefore, nitration of the receptacle 27 caused by ammonia is suppressed even when the inside of the receptacle 27 of the reactor 11 with the heat exchange section becomes high temperature. As a result, the generated amount of hydrogen with nitration becomes smaller than a case where the nickel layer is not formed on the inner surface of the receptacle 27. As a result, since the reduction in the partial pressure of ammonia is suppressed, the deterioration of the heat generation performance of the chemical heat storage device 10 is suppressed. Further, since the change in pressure in the system through which ammonia flows is also suppressed, a high precision control can be performed when controlling the valve 14 and the like, using the internal pressure of the system in the chemical heat storage device 10.

As a method for forming the nickel layer 28, for example, there is a method for forming the nickel layer 28 by a nickel plating process. In this method, in order to form the nickel layer 28, a nickel plating process is performed in the state of each member constituting the receptacle 27 before assembling, and the receptacle 27 is assembled using the respective members. As a case where the nickel plating process is performed in the state of each member, there are a case where a nickel layer is formed only on the inner surface side of the receptacle 27 assembled from each member, and a case where a nickel layer is formed on the inner surface side and the outer surface side. When the entire member is subjected to nickel plating process, a nickel layer is also formed on the outer surface side of the receptacle 27 assembled from the member. In order to form the nickel layer only on the inner surface side of the receptacle 27, it is necessary to perform a procedure such as masking of a portion other than the portion serving as the inner surface of the receptacle 27 in the member when performing the nickel plating process. The thickness of the nickel layer 28 formed by the nickel plating process is, for example, 20 μm.

As the nickel plating process, well-known nickel plating processes, for example, an electrolytic nickel plating process and an electroless nickel plating process are adopted. In the electrolytic nickel plating process, a nickel coating containing nickel at about 100% by mass (for example, 99.5% by mass) is obtained. In the electroless nickel plating process, a nickel coating containing constituents other than nickel is obtained. The electroless nickel plating process includes, for example, a Ni—P plating process and Ni—B plating process. In the case of the Ni—P plating process, the composition of the nickel coating is, for example, 87 to 98% Ni (nickel) by mass and 2 to 13% P (phosphorus) by mass. In the case of the Ni—B plating process, the composition of the nickel coating is, for example, 97 to 99% Ni by mass and 1 to 3% B (boron) by mass. In the case of electroless nickel plating process, the properties of the nickel coating are excellent (for example, pinholes are hard to form, and film thickness is uniform), and a uniform nickel coating can be formed on plated objects with complicated shapes, objects to be plated with fine irregularities, etc.

Figure 6:
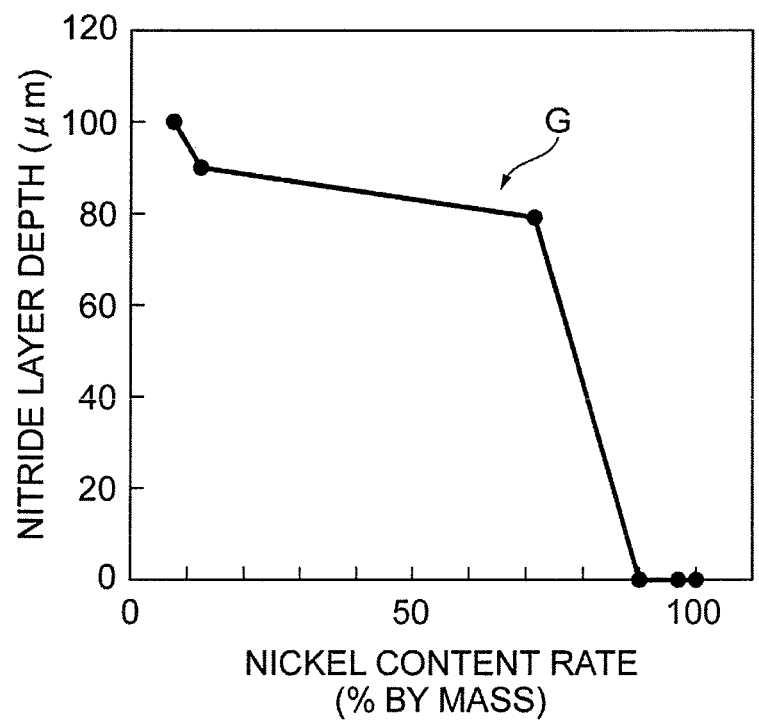
FIG. 6 is a graph illustrating an example of a relation between a nickel content rate of a nickel layer and a depth of the nitrided layer in a reactor with a heat exchange section.

An example of the nitridation suppression effect according to the nickel content rate of the nickel layer 28 of the receptacle 27 will be described with reference to FIG. 6. As a measure of the nitridation suppression effect, the depth of the nitrided layer (nitride compound) formed inside from the surface of the inner surface side of the receptacle 27 was used. As the depth of the nitrided layer is deep, the nitridation proceeds and the generated amount of hydrogen increases. FIG. 6 is a graph G illustrating an example of a relation between the nickel content rate of the nickel layer 28 and the depth of the nitrided layer in the reactor 11 with the heat exchange section. A horizontal axis is the nickel content rate (% by mass), and a vertical axis is the depth (μm) of the nitrided layer.

In this example, the test was performed, using the receptacle 27 formed with a nickel layer 28 having a nickel content rate of 90% by mass (for example, a nickel layer provided by a Ni—P plating process), a nickel layer 28 having a nickel content rate of 98% by mass (for example, a nickel layer provided by a Ni—B plating process), and a nickel layer 28 having a nickel content rate of approximately 100% by mass (for example, a nickel layer formed by an electrolytic nickel plating process), respectively. The thickness of each nickel layer 28 was 20 μm. As a comparative example, the test was performed, using each receptacle each having a nickel content rate of 8% by mass (for example, SUS 304), 11% by mass (for example, SUS 316), and 72% by mass (for example, inconel), respectively. In this test, ammonia was supplied into the receptacle, the temperature inside the receptacle was 500° C. or higher, and this state was maintained for 10 hours. Further, after completion of the test, the hardness of the cross section of the receptacle was measured with a Vickers hardness tester, and the depth of the nitrided layer formed on the inner surface side of the receptacle was estimated, using the hardness. As a result, when the nickel content was 90% by mass, 98% by mass, and approximately 100% by mass, no nitrided layer was formed (the depth of the nitrided layer was 0 μm). On the other hand, when the nickel content is 8% by mass, a nitrided layer with a depth of 100 μm was formed, and when the nickel content was 11% by mass, a nitrided layer with a depth of 90 μm was formed, and when the nickel content rate was 72%, a nitrided layer with a depth of 80 μm was formed. FIG. 6 illustrates a graph obtained by using the respective nickel content and the depth of the nitrided layer.

From this result, if the nickel layer 28 has a nickel content rate of 90% by mass or more, because the nitrided layer cannot be formed in the receptacle 27, the nitridation can be suppressed. Accordingly, since the reduction in the partial pressure of ammonia is suppressed, it is possible to sufficiently obtain the heat generation performance of the chemical heat storage device 10. However, even if nickel is contained, when the nickel content is low, since the nitrided layer can be formed, the nitridation cannot be sufficiently suppressed.

According to the chemical heat storage device 10, since the nickel layer 28 is formed on the inner surface of the receptacle 27 of the reactor 11 with the heat exchange section, even when the reactor 11 with the heat exchange section enters a high-temperature state, the nickel layer 28 can suppress nitridation of the receptacle 27 caused by ammonia. Therefore, in the chemical heat storage device 10, it is possible to suppress deterioration in heat generation performance due to nitridation of the receptacle 27 caused by ammonia in the reactor 11 with the heat exchange section. As a result, since the temperature of the exhaust gas can be rapidly raised, temperature of each catalyst such as DOC 4 can be rapidly raised to the activation temperature.

In the chemical heat storage device 10, the nickel layer 28 containing 90% by mass or more can be easily formed on the inner surface of the receptacle 27 by the nickel plating process. Further, in the chemical heat storage device 10, the thickness of the nickel layer 28 can be adjusted to a desired thickness by forming the nickel layer 28 using the nickel plating process.

In the chemical heat storage device 10, since the reactor 11 with the heat exchange section has the plurality of heat exchange sections 23 and the plurality of heat storage materials 24 alternately laminated, the heat exchange efficiency between the exhaust gas and the heat storage material 24 is improved, and the heating efficiency and heat storage efficiency of the reactor 11 with the heat exchange section is improved.

Although the embodiments of the present invention have been described above, the present invention is not limited to the above-described embodiments and is embodied in various forms.

For example, in the above embodiment, the receptacle of the reactor with the heat exchange section is applied to a configuration formed of stainless steel. However, the present invention is not particularly limited thereto, and the invention may be applied to a receptacle formed of other metallic materials such as steel, titanium, and titanium alloy, other than stainless steel. When the receptacle made of the metallic material enters a high-temperature state, the nitridation reaction between the metal constituent contained in the metallic material and ammonia is promoted. Therefore, by forming a nickel layer on the inner surface of the receptacle, it is possible to suppress deterioration of heat generation performance due to the nitridation.

The above embodiment is configured so that the reactor with the heat exchange section is disposed on the upstream side of the DOC, and the reactor is heated via the heat exchange section. However, the reactor may be disposed at another portion and heated. For example, the reactor may be disposed at the outer circumference of a catalyst of one of DOC, SCR or ASC. In the above embodiment, the reactor with the heat exchange section having a configuration in which the heat storage material and the heat exchange section are alternately laminated is used, and a receptacle which houses a plurality of heat storage materials with a heat exchange section sandwiched therebetween is used. However, the configuration of the reactor, the shape of the receptacle, and the like are not particularly limited thereto. For example, a reactor in which a heat storage material is contained in a receptacle having an annular cross section surrounding a substantially cylindrical heat exchange section may be used, a reactor in which a heat storage material is housed in a rectangular parallelepiped reactor may be used, and a plurality of a rectangular parallelepiped reactors and a plurality of rectangular parallelepiped heat exchange sections may be laminated alternately.

Figure 7:
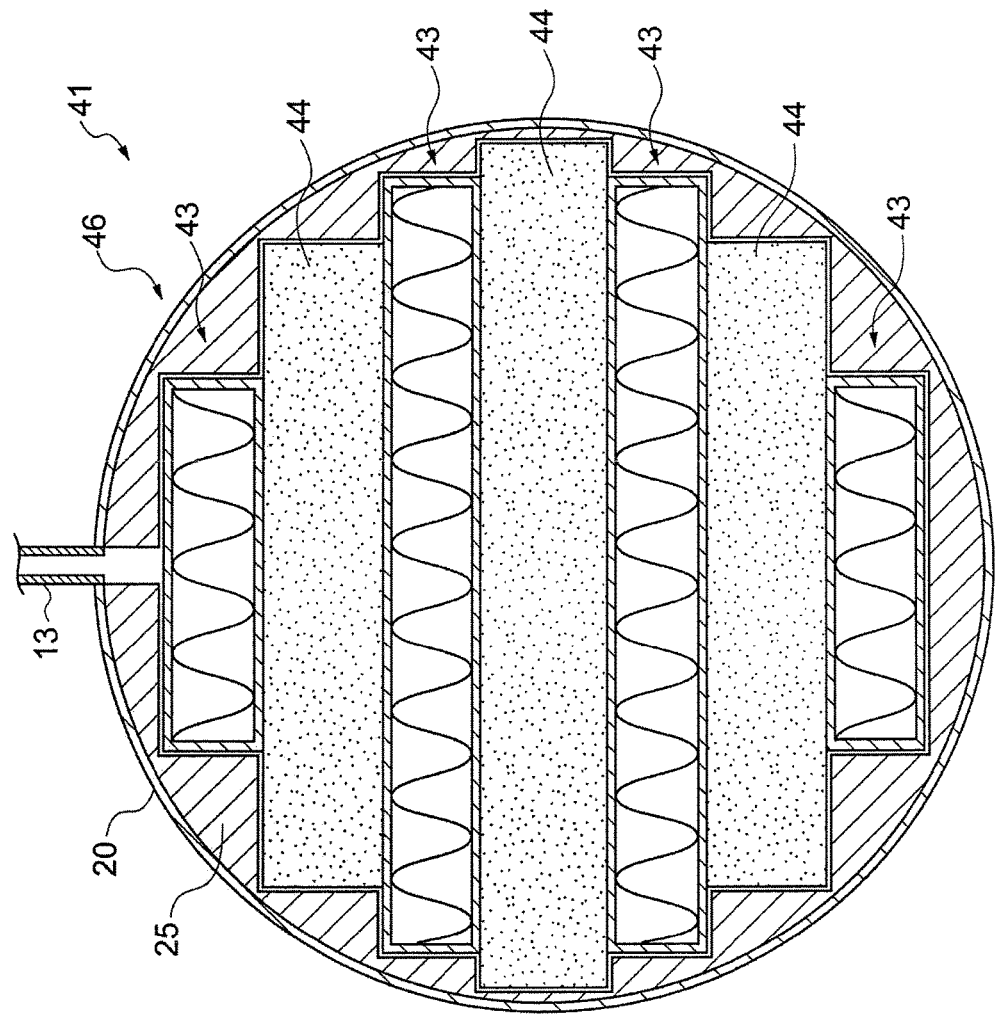
FIG. 7 is a side cross-sectional view of a reactor with a heat exchange section according to another embodiment.

Further, in the above embodiment, the configuration in which the heat storage material is disposed at both end portions (the outermost portions in the lamination direction) of the laminated body is used. However, a configuration in which the heat exchange section is disposed at both end portions of the laminated body may be used. The reactor 41 with a heat exchange section according to this embodiment will be described with reference to FIG. 7. FIG. 7 is a side sectional view of the reactor 41 with the heat exchange section according to another embodiment. In the reactor 41 with the heat exchange section, a plurality of heat exchange sections 43 and a plurality of heat storage materials 44 are alternately laminated to form a laminated body 46. The heat exchange sections 43 are disposed at both end portions of the laminated body 46. The heat exchange section 43 is disposed between the heat storage material 44 and the heat storage material 44 adjacent to each other in the lamination direction of the laminated body 46 or at the end portion in the lamination direction. The heat storage material 44 is disposed between the heat exchange section 43 and the heat exchange section 43 adjacent to each other in the lamination direction of the laminated body 46. In the case of this configuration, the number of the heat exchange sections 43 is one more than the number of the heat storage materials 44. In FIG. 7, the number of the heat exchange sections 43 is four, and the number of the heat storage materials 44 is three. However, the numbers of the heat exchange sections 43 and the heat storage material 44 are not particularly limited thereto and may be any appropriate number.

Further, in the above embodiment, the nickel layer is formed by the nickel plating process, but the nickel layer may be formed by another method. For example, a receptacle is manufactured, using a clad material (for example, clad material of SUS/Ni or Ni/SUS/Ni) obtained by rolling joining a plate material made of stainless steel (for example, a plate material made of SUS) and a plate material made of pure nickel. On at least the inner surface of the receptacle, a plate member made of nickel among clad materials is disposed, and the plate member made of nickel is formed as a nickel layer. The nickel layer contains nickel at about 100% by mass. Further, the nickel layer may be formed, using a nickel alloy containing 90% nickel by mass or more and a constituent such as Si and Mn which is hard to cause a nitridation reaction with ammonia.

Further, in the above embodiment, the nickel layer is formed on the inner surface of all the receptacles of the reactor with the heat exchange section. However, when there is a portion in the receptacle which does not become high temperature as the nitridation is performed, the nickel layer may not formed on the inner surface of that portion or the thickness of the nickel layer may be made thin. For example, in the case of a reactor surrounding the heat exchange section, a heat exchange section is disposed on the inner circumferential surface side, but since the heat exchange section is not disposed on the outer circumferential surface side, there is a possibility that the outer circumferential surface side does not become high temperature. Further, when there is a portion which does not contact with ammonia on the inner surface of the receptacle, the nickel layer may not be formed on the inner surface of that portion.

In the above embodiment, the nickel layer is formed on the inner surface of the receptacle of the reactor with the heat exchange section, but when a member made of a metallic material is provided inside the receptacle, a nickel layer may also be formed on the surface of the member which comes into contact with the ammonia. As a member provided inside the receptacle, for example, there is a porous body provided for rapidly diffusing ammonia in a reactor or the like surrounding the heat exchange section, and the porous body may be formed of a metallic material. By forming a nickel layer on the surface of the member which comes into contact with ammonia, it is possible to further suppress the deterioration of the heat generation performance due to nitridation caused by ammonia.

In the above embodiment, a nickel layer is formed in the receptacle of a reactor with the heat exchange section, but in a case where there is a portion in which the temperature rises as nitridation is performed in addition to the reactor, a nickel layer may also be formed in that portion. For example, there is a possibility that the temperature of the portion of the connecting pipe in the immediate vicinity of the reactor rises. The connecting pipe is also made of a metallic material such as stainless steel. Therefore, by forming a nickel layer also on the inner surface of the portion of the connecting pipe in the immediate vicinity of the reactor, it is possible to further suppress the deterioration of the heat generation performance due to the nitridation caused by ammonia.

Further, in the above embodiment, there is a description that additives for improving the thermal conductivity may be mixed with the heat storage material. However, in a case where nitridation may occur on the surface of the additive, a nickel layer may also be formed on the surface of the additive.

Further, in the above embodiment, the chemical heat storage device which heats (warms up) the exhaust gas discharged from the diesel engine has been described, but it is not particularly limited thereto, the invention may be applied to a chemical heat storage device that heats the exhaust gas discharged from a gasoline engine. Further, the invention may be applied to a chemical heat storage device that heats a gaseous or liquid state fluid (for example, oil, water, air, and water vapor) in addition to the exhaust gas. Further, the chemical heat storage device may be applied to garbage incineration plants, power plants, various plant factories, and the like, in addition to engines.

REFERENCE SIGNS LIST

1 . . . exhaust gas purification system, 2 . . . engine, 3 . . . exhaust pipe, 4 . . . DOC, 5 . . . DPF, 6 . . . SCR, 7 . . . ASC, 10 . . . chemical heat storage device, 11, 41 . . . reactor with heat exchange section, 12 reservoir, 12*a* . . . adsorptive material, 13 . . . connecting pipe, 14 . . . valve, 20 . . . pipe, 20*a* . . . inner circumferential surface, 20*b* . . . through-hole, 21, 22 . . . lid member, 21*a* . . . through-hole, 21*b*, 22*b* . . . surface, 23, 43 . . . heat exchange section, 23*a* . . . tube, 23*b* . . . fin, 23*c* . . . opening portion, 23*d* . . . surface, 24, 44 . . . heat storage material, 25 . . . heat insulating material, 25*a* . . . through-hole, 25*b* . . . groove portion, 26, 46 . . . laminated body, 27 . . . receptacle, 28 . . . nickel layer, 30, 31 . . . tapered pipe.

The invention claimed is:

1. A chemical heat storage device comprising:
   a reactor which has a heat storage material which generates heat by a chemical reaction with a reactive medium and desorbs the reactive medium by heat absorption, and a receptacle which houses the heat storage material therein;
   a reservoir which stores the reactive medium; and
   a connecting pipe through which the reactor and the reservoir communicate with each other and the reactive medium is allowed to flow between the reactor and the reservoir, wherein
   the reactive medium is ammonia,
   the receptacle is made of a metallic material, and
   at least a portion of an inner surface of the receptacle which comes into contact with the ammonia is formed with a nickel layer containing 90% nickel by mass or more.

2. The chemical heat storage device according to claim 1, wherein
   the nickel layer is formed by a nickel plating process.

3. The chemical heat storage device according to claim 1, wherein
   the receptacle is manufactured using a clad material formed of a plate material made of the metallic material and a plate material made of nickel, and
   the nickel layer is formed of the plate material made of nickel in the clad material.

4. The chemical heat storage device according to claim 1, wherein
   the metallic material is stainless steel.

5. The chemical heat storage device according to claim 1, wherein
   the reactor has the plurality of heat storage materials and a plurality of heat exchange sections, and
   the plurality of heat storage materials and the plurality of heat exchange sections are alternately laminated.

* * * * *